United States Patent Office 3,751,535
Patented Aug. 7, 1973

3,751,535
PREPARATION OF MOULDING COMPOSITIONS CONTAINING GLASS FIBERS
Vincenzo Ruoti and Felice Farioli, Milan, Italy, assignors to Snia Viscosa Società Nazionale Industria Applicazioni Viscosa, Milan, Italy
No Drawing. Filed Dec. 28, 1970, Ser. No. 102,085
Claims priority, application Italy, Dec. 31, 1969, 26,552/69
Int. Cl. B01j 2/20
U.S. Cl. 264—141                                    3 Claims

ABSTRACT OF THE DISCLOSURE

A method of forming a granulated compound having excellent physical properties and consisting of a mixture of a synthetic linear polyamide, a synthetic linear polyester and glass fibers by feeding suitable amounts of said polyamide, polyester and glass fibers to an extruder and then granulating the resulting extruded mixture.

BACKGROUND

This invention relates to molding compounds made on the basis of fiber glass strengthened synthetic polymers and having excellent physical properties. More particularly, this invention concerns molding compounds having excellent physical properties and obtained from currently produced polymers and especially from scraps of said polymers, along with a method for obtaining said compounds.

The use of synthetic linear polymers and in particular of synthetic linear polyamides and polyesters as molding compounds is already known. It has been also proposed to strengthen said polymers with glass fibers. In particular, compounds having excellent physical properties and obtained by a special method from fiber glass-strengthened polyhexamethylenadipamide have not yet been described.

Expressly prepared synthetic linear polymers and in particular very high viscosity polymers are utilized as starting materials for the above stated molding compounds. Said polymers are then reinforced with glass fibers having suitable properties. The modulus of elasticity, tensile strength, hardness, water absorption, dimensional stability and so on may be quoted as physical properties relevant for a molding compound.

On the other hand, an inexpensive source of synthetic polymers which can be utilized for obtaining molding compounds are the scraps of synthetic linear fiber production, as e.g. polyamide and polyester fibers. Such scraps obviously show a molecular structure, a polymerisation degree, a viscosity and so on as ensuing from the fact that said polymers were originally adjusted for specific applications in the field of fiber production and then suffered a general deterioration in their features due to the operations as required for recovering and reutilizing same for obtaining molding compounds. This is particularly true in recovering nylon-6 (i.e. polycapronamide) scraps, as obtained in spinning such polyamides. Notwithstanding said polyamides may be strengthened with glass fibers, the attained improvement in their physical properties is always smaller than a desirable optimum value. For approaching such optimum value, the scrap recovery is dispensed with and high viscosity polymers, having unusually excellent physical properties, may be expressly prepared.

THE INVENTION

The applicants have now surprisingly ascertained that when nylon-6 or polycapronamide scraps are mixed in a suitable ratio with polyethylene-terephthalate having usual physical properties as currently obtained in synthetic fiber producing methods and possibly in the form of scraps ensuing from such operations, and when said mixture is strengthened with glass fibers in a suitable ratio, a resulting compound is obtained that, after granulating, drying and injection molding conventional procedures, gives very rigid and hard molded articles having very good dimensional stability, high mechanical resistance and on the whole very good physical properties.

The mixing operation of said polymers is preferably carried-out during extrusion operations thereon in order to obtain granulated compounds and in a ratio of 90:10 to 50:50 by weight, and preferably of about 70 parts by weight of reclaimed polyamide to 30 parts by weight of polyethylene-terephthalate. The compound strengthening glass fibers are used in a conventional manner and with rather usual ratios, e.g. in the range of 40 to 10 parts by weight of glass fibers and 60 to 90 parts by weight of polymer, and preferably of about 25 parts by weight of glass fibers to 75 parts by weight of polymer, in this case, of polymer mixture. Thus, the method for obtaining compounds according to this invention essentially consists in feeding a required amount of polyamide scraps and polyethylene-terephthalate, as well as a required amount of glass fibers to an extruder and then in processing the resulting extruded mixture in an already known manner.

The utilized polyamide is a nylon-6 having essentially the following properties: relative viscosity from 2.2 to 4 (1% solution of polymer in concentrated $H_2SO_4$. The test is carried out at 20° C.), molecular weight in the range of 12,000 to 30,000; amount of monomer that can be extracted with water from 0.05 to 5%; specific gravity in the range of 1.12 to 1.14; water absorption (in 24 hrs. at 23° C.) from 0.5 to 4%.

Such polymer, when utilized for producing injection molded articles, even if reinforced with glass fibers, would give products having rather poor physical properties, as stated in more detail later on.

Obviously, scraps of other polyamides may be used and in particular scraps of polyhexamethylene adipamide, i.e. nylon-66, which represents along with nylon-6 the main nylon type utilized for producing synthetic filaments. Moreover, originally prepared polyamides could be utilized instead of said scraps, with a lowering in economical advantages of this invention but likewise important technical results.

Said polyethylene terephthalate which is added to polyamide in the above stated ratios is of a usual type as utilized in producing synthetic filaments. Scraps resulting from said filament production may also be utilized. Such polyethylene terephthalate may show e.g. the following properties: intrinsic viscosity from 0.4 to 0.9 (tested at 20° C. in a 60/40 by weight mixture of phenol-tetrachloroethane; concentration: 1 g. of polymer in 100 ml. of solvent); molecular weight from 12,000 to 30,000; specific gravity from 1.33 to 1.39; water absorption (in 24 hrs. at 23° C.) from 0.05 to 0.4%.

The glass fibers are of a type usually utilized for strengthening plastics with a length ranging from 1 to 6 mms. and a diameter in the range of 6 to 10 microns. Mixtures of glass fibers having different sizes but always within the above ranges can also advantageously be utilized.

A few merely illustrative examples of the invention will be now described.

Example 1

70 parts of granulated nylon-6 of a spinning grade having normal properties and a relative viscosity of 2.7 were dried and pre-mixed with 30 parts of dried granulated polyethylene terephthalate of a normal (spinning) grade, having an intrinsic viscosity (tested in phenol-tetrachloroethane) of 0.65, in a cylindrical revolving-arm mixer.

The resulting mixture was further homogenized by extruding the same under the following temperature conditions: 220° C. (cylinder inlet), 260° C. (cylinder half-way), 265° C. (cylinder outlet); extrusion heads= 265° C., extrusion die=255° C.

The extruded monofilament was collected in water and granulated in a conventional manner. 75 parts of the resulting granules after suitable drying treatment were mixed in the same revolving-arm mixer with 25 parts of glass fibers, having a length from 1 to 3 mms. and a diameter in the range of 6 to 10 microns (of a commercially available type), and then processed again in an extruder under the following temperature conditions: 230° C. (cylinder inlet), 270° C. (cylinder half-way), 270° C. (cylinder outlet); extrusion head=270° C., extrusion die=265° C. The extruded monofilament was collected in water and then granulated.

The thus obtained polymer was further dried down to a moisture content lower than 0.05% of water and stored in tightly sealed cans. The physical properties of such product were as in Table I.

The resulting thoroughly mixed mass was then processed in a usual extruder under the following temperature conditions: cylinder inlet=230° C.; cylinder half-way= 275° C.; cylinder outlet=275° C.; extrusion head=275° C.; extrusion die=270° C.

The extruded polymer was collected in water and granulated in a usual manner, dried and stored in tightly sealed cans. The properties of the resulting product were as stated in Table I.

Example 3

The procedure of Example 2 was repeated, with the following starting materials:

45.5 parts of nylon-6 spinning scraps (relative viscosity 2.55), 19.5 parts of polyethylene terephthalate spinning scraps (intrinsic viscosity 0.6), 35 parts of glass fibers.

The results of this example are as shown in Table I.

TABLE I

Composition (parts per 100 parts by weight)

| Properties | Method ASTM | Units | 52.5 pp. of normal spinning grade nylon-6, 22.5 pp. of normal spinning grade polyethylene terephthalate, 25 pp. of glass fibres, 1-3 mm. long plus calcium stearate | 5.25 pp. of nylon-6 spinning scraps, 22.5 pp. of polyethylene terephthalate spinning scraps, 25 pp. of glass fibres 1-3 mm. long plus calcium stearate | 45.5 pp. of nylon-6 spinning scraps, 19.5 pp. of polyethylene terephthalate spinning scraps, 35 pp. of glass fibres 1-3 mm. long plus calcium stearate | Nylon-6 spinning scraps, relative viscosity 2.6 | 75 pp. of nylon-6 spinning scraps, relative viscosity 2.6, 25 pp. of glass fibres 1-3 mm. long plus calcium stearate | Polyethylene terephthalate spinning scraps, intrinsic viscosity 0.6 | 75 pp. of polyethylene terephthalate spinning scraps, 25 pp. of glass fibres 1-3 mm. long plus calcium stearate |
|---|---|---|---|---|---|---|---|---|---|
| | | | Example 1 | Example 2 | Example 3 | Control | Control | Control | Control |
| Rockwell hardness | D 785-62 | Scale L | 113 | 114 | 116 | 99 | 110 | 115 | 114 |
| Tensile strength | D 638-64 T | kg./sq. cm | 1,465 | 1,380 | 1,520 | 715 | 1,220 | 520 | 665 |
| Ultimate elongation | D 638-64 T | Percent | <2 | <2 | <2 | 6 | <5 | <2 | <2 |
| Stretch modulus of elasticity | D 638-64 T | kg./sq. cm | 123,000 | 118,000 | 134,000 | 31,000 | 79,000 | 36,400 | 108,000 |
| Resistance to bending stress | D 790-03 | kg./sq. cm | 2,260 | 2,080 | 2,460 | 1,360 | 1,890 | 710 | 1,140 |
| Izod impact strength (on notched specimen) | D 256-56 | kg. cm./cm. | 5.8 | 5.1 | 6.9 | 4.00 | 4.3 | 1.12 | 4.45 |
| Water absorption (24 hrs. at 23° C.) | D 570-63 | Percent | 0.66 | 0.61 | 0.52 | 1.36 | 1.10 | 0.068 | 0.075 |
| Specific gravity | D 792-64 T | kg./cu. dm | 1.40 | 1.41 | 1.48 | 1,135 | 1.32 | 1.40 | 1.66 |
| Melting temperature | D 2117-64 | °C | 220-260 | 220-260 | 220-260 | 222 | 222 | 260 | 260 |
| (VICAT) softening point | D 1525-58 T | °C | 224 | 219 | 228 | 221 | 221 | 237 | 248 |
| Distortion temperature (18.5 kg.) | D 648-56 | °C | 220 | 221 | 225 | 80 | 195 | 96 | 243 |
| Distortion temperature (6.42 kg.) | D 648-56 | °C | 222 | 221 | 226 | 169 | 210 | 186 | 226 |
| Average molding temperature | | °C | 265 | 270 | 280 | 220 | 240 | 260 | 270 |
| Mold temperature | | °C | 140 | 140 | 140 | 20 | 80 | 140 | 140 |
| Molding shrinkage (3 mm. thick) | D 955-51 | Percent | 0.11 | 0.12 | 0.08 | 0.96 | 0.29 | 1.80 | 0.15 |
| Immersion for 8 hrs in water at 80° C of 6.4 mm. thick specimens, measured and weighted in dry conditions as obtained from the injection molding machine and before said immersion. | | Water absorption (in respect of dry specimen) Percent | 1.19 | 1.16 | 1.01 | 3.0 | 2.10 | 0.18 | 0.16 |
| | | Length increase (in respect of dry specimen) Percent | +0.063 | +0.06 | +0.048 | +0.390 | +0.175 | +0.02 | (0.012) |

Example 2

52.5 parts of filaments and milled spinning scraps of nylon-6 (relative viscosity about 2.6), along with 22.5 parts of filaments and milled spinning scraps of polyethylene terephthalate (intrinsic viscosity 0.63), 25 parts of glass fibers having a length of 1 to 3 mms. and a diameter from 6 to 10 microns (of a commercially available type) and 0.5 part of calcium stearate lubricants were put into a cylindrical revolving-arm mixer.

The best physical properties of the products obtained according to any one of above examples are shown when said products are molded on conventional injection molding machines with a cylinder temperature in the range of 250° C.–270° C. and a mold temperature of about 140° C.

Indeed, when working at the above stated temperatures, articles with mirror-polished surfaces and having a particularly good appearance are obtained.

The surprising technical results of this invention are shown in Table I, wherein a few essential properties of products obtained according to the above examples are compared with those of molded articles formed with polyamide only or polyester only and strengthened or not with glass fibers.

As it can be noticed from the above Table I, the properties of molding compounds according to this invention are excellent and superior to those obtained from nylon-6 only or polyester only when polymers having properties similar to those of polymers utilized in carrying out this invention are used. Obviously the starting polymer properties affect those of compounds obtained by strengthening said polymer with glass fibers and thus a polyamide or a polyester having a higher viscosity would have a corresponding higher mechanical strength, as occurs in compounds obtained from such polymer.

Similarly, when a compound according to this invention is obtained from polymers having particularly excellent physical properties, then the properties of said compound shall be improved over those shown in Table I. However, since this invention is particularly advantageous in that it allows preparation of high-grade articles from scraps which in and by themselves may give low grade molding compounds only, a more outstanding comparison is obtained when such scraps are considered, and the above table was drawn up accordingly.

It is to be understood that it is not possible to improve the physical properties of starting polymers beyond a given limit, because when the intrinsic viscosity of said polymers is too high, they cannot be extruded and are granulated and strengthened with glass fibres only with difficulty requiring difficult and expensive treatments.

A synergic effect is thus shown by the compounds according to this invention, since the properties thereof are not equal to an average of those as shown by compounds obtained from the components of said compound mixture, but are improved over those properties of the separate components of the compound mixture. Said synergic effect is wholly unexpected and surprising, and the present invention for obtaining molded articles having excellent physical properties, starting from cheaper and relatively low-grade products, is based essentially thereon.

While preferred embodiments of this invention were herein described, it is to be understood that many changes and modifications may be made therein without departing from the spirit and scope of the same.

We claim:
1. A method of preparing a molding composition consisting essentially of:
    (a) admixing
        (1) spinning scraps of a synthetic linear polyamide having a relative viscosity of 2.2–4, a molecular weight of 12,000–30,000, a 0.05–5% monomer extraction with water, a specific gravity of 1.12–1.14 and a water absorption of 0.5–4% in 24 hours at 23° C.
        (2) spinning scraps of a synthetic polyester having an intrinsic viscosity of 0.4–0.9, a molecular weight of 12,000–30,000, a specific gravity of 1.33–1.39 and a water absorption of 0.05–4% in 24 hours at 23° C., and
        (3) glass fibers having a length of 1–6 mm. and a diameter of 6–10 microns at a weight ratio of polyamide to polyester of 90:10 to 50:50 and a weight ratio of glass fibers to the total of polyamide and polyester of 40:60 to 10:90,
    (b) heat extruding the resultant mixture and
    (c) granulating the extruded mixture.
2. The method according to claim 1, wherein the weight ratio of polyamide to polyester is 70:30.
3. The method according to claim 1, wherein the weight ratio of glass fibers to the total of polyamide and polyester is 25:75.

References Cited
UNITED STATES PATENTS

| | | | |
|---|---|---|---|
| 3,193,601 | 7/1965 | Billingsley | 264—142 |
| 3,194,859 | 7/1965 | Wacker | 264—122 |
| 3,453,356 | 7/1969 | Kent, Jr. et al. | 264—143 |

ROBERT F. WHITE, Primary Examiner

J. R. HALL, Assistant Examiner

U.S. Cl. X.R.

264—Dig. 69